Dec. 29, 1970   JEAN-CLAUDE ASSCHER   3,550,228
METHOD OF ASSEMBLING LEADS TO AN ELECTRICAL
COMPONENT AND POTTING SAME
Filed Aug. 6, 1968                                        4 Sheets-Sheet 1
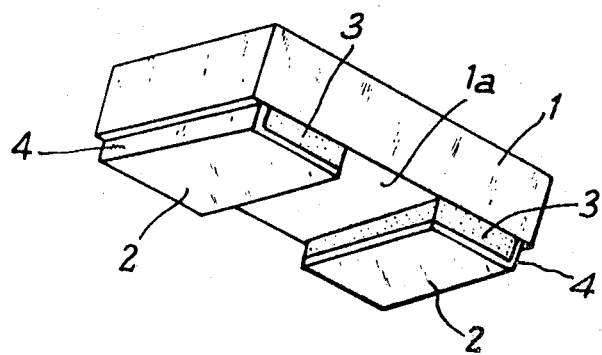
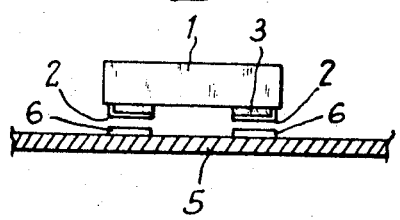
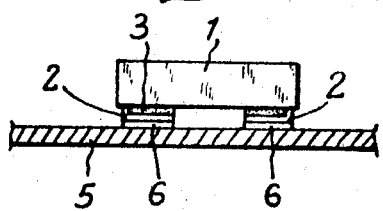

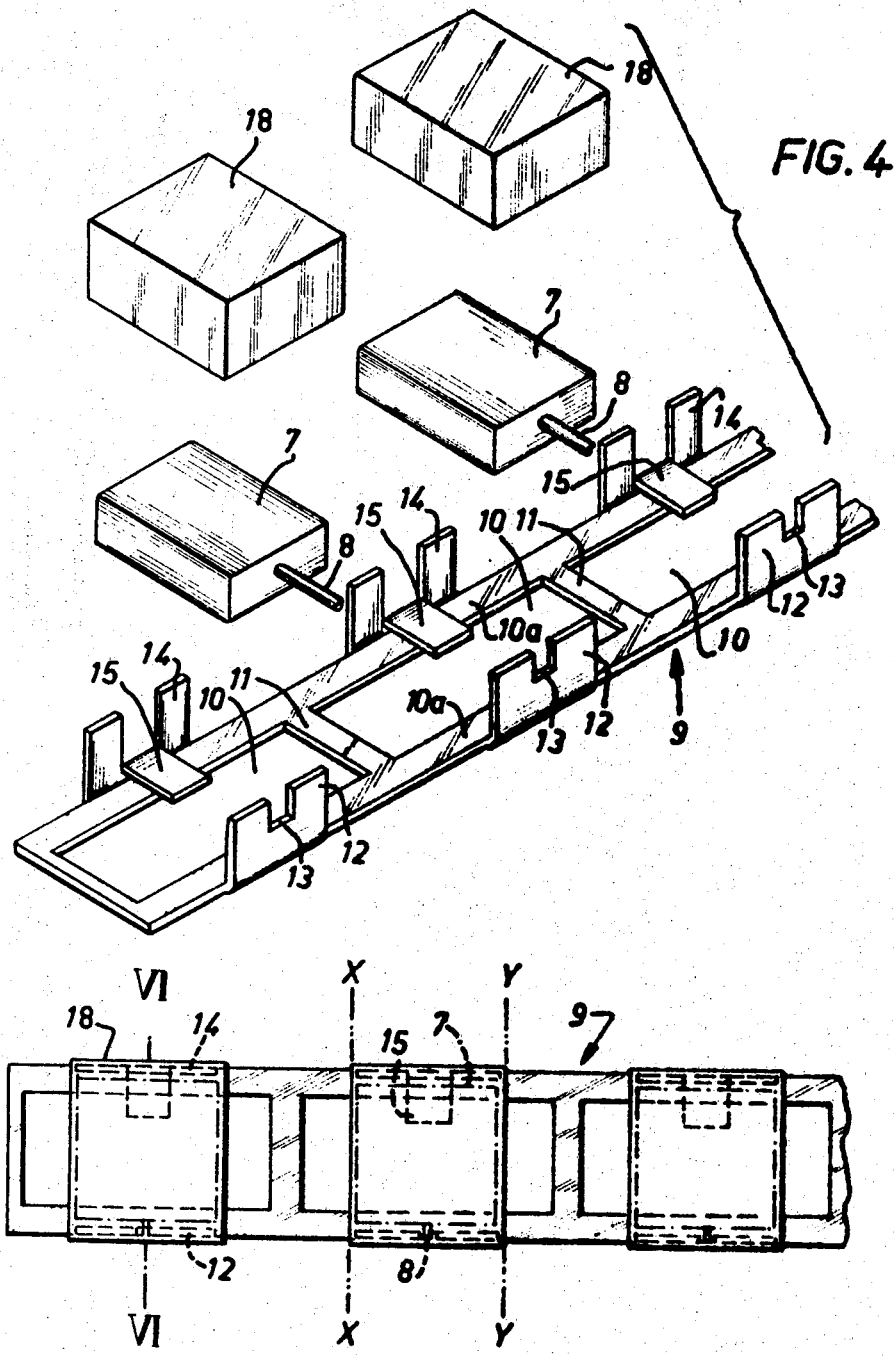

Dec. 29, 1970   JEAN-CLAUDE ASSCHER   3,550,228
METHOD OF ASSEMBLING LEADS TO AN ELECTRICAL
COMPONENT AND POTTING SAME
Filed Aug. 6, 1968   4 Sheets-Sheet 3

United States Patent Office 3,550,228
Patented Dec. 29, 1970

3,550,228
METHOD OF ASSEMBLING LEADS TO AN ELECTRICAL COMPONENT AND POTTING SAME
Jean-Claude Asscher, 28 Rue Lauriston, Paris 16eme, France
Filed Aug. 6, 1968, Ser. No. 750,630
Claims priority, application France, Nov. 29, 1967, 130,093; Mar. 29, 1968, 3,486; Apr. 16, 1968, 3,493
Int. Cl. H01g 13/00; H01b 13/00
U.S. Cl. 29—25.42                                6 Claims

ABSTRACT OF THE DISCLOSURE

An electrical or electronic component with two electrodes to which connecting leads are attached. The component is provided with a flat face to which are attached two separate plates. These are in electrical contact with respective electrodes but are electrically insulated from each other. The method of construction is to fix the component's electrodes to metal parts of a common support, cover that assembly with a cap, turn it over and fill the cap with a plastic material, and then cut off parts of the support to leave two separate metal plates exposed at the surface of the plastic material.

---

Figure 6:
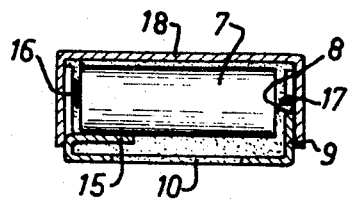

The output terminal of a condenser or of a resistor have hitherto generally been formed by two wires which leave the condenser or resistor through two opposite faces of the latter. When building an electric circuit, these wires are, for example, soldered to relay terminals. In the case of a printed circuit, the soldering of these wires to the circuit raises problems which are difficult to resolve.

The object of the present invention is to provide an electrical or electronic component, such as a tantalum condenser, whose incorporation into a printed circuit is easily accommodated.

The electrical or electronic component according to the invention comprises a body with a substantially flat face, and two separate flat plates disposed on said face and insulated from each other, said plates providing lead connection zones.

The component according to the invention can be soldered directly into a printed circuit. The flat strips or plates are advantageously formed by metallization and the flat face of the component to which they are attached preferably extends longitudinally of the component.

In one particular embodiment of the invention, the flat plates have a length greater than the corresponding dimension of the casing of the component. In this case, they can project on either side of the casing and may have their free ends folded at right angles to the flat face.

The component according to the invention has the advantage of being capable of being connected very easily to a circuit of thin or thick layer construction; for example to a printed circuit, to an integrated circuit, or even to a circuit formed by evaporation or silkscreen printing on a ceramic support. Thus, if the lead connector plates are of eutectic alloy which melt at a low temperature or are a coating of such an alloy, it is sufficient to place the component on the circuit and to heat gently so that the surface of the alloy melts, this ensuring the connection of the component.

The present invention is also concerned with a process for the manufacture of the component as described above.

This process consists of disposing the body of the electrical or electronic component on an element having two metal portions each carrying connecting tabs, connecting said body to said tabs, covering said body and said tabs with a cap, reversing the assembly thus formed, and pouring a plastic material into the interior of the cap so that the metal portions project in relation to the plastic material to form lead connection plates.

When the component is, for example, a condenser made of tantalum, which comprises a body forming one of the electrodes and a wire projecting from the body, the wire being insulated from the body and forming the other electrode, one of the connecting tabs can be provided with a downwardly pressed tongue which serves as a support for the body. The other tab can be provided with a groove or recess adapted to receive the wire.

In one advantageous form of this process, a metallic strip is used having a series of openings defined by longitudinal edge portions and transverse bars. The longitudinal edges of the strip carry the connecting tabs opposite the middle of the openings. After pouring the plastic material, the strip is cut into sections, on each side of the caps, so as to remove the transverse bars and thus to insulate from one another the two longitudinal sides of each opening, these sides then forming the output plates.

In another method, a strip of plastic material is used, beneath which are disposed two metallic elements which extend longitudinally of the strip and from which the connector plates are to be formed, their connecting tabs extending through the strip.

Figure 7:
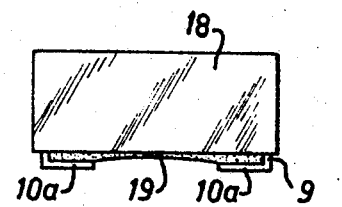
Figure 8:
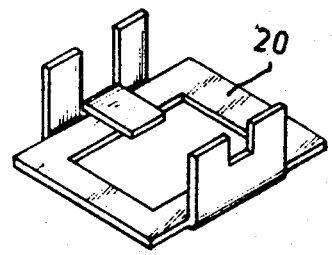
Figure 9:
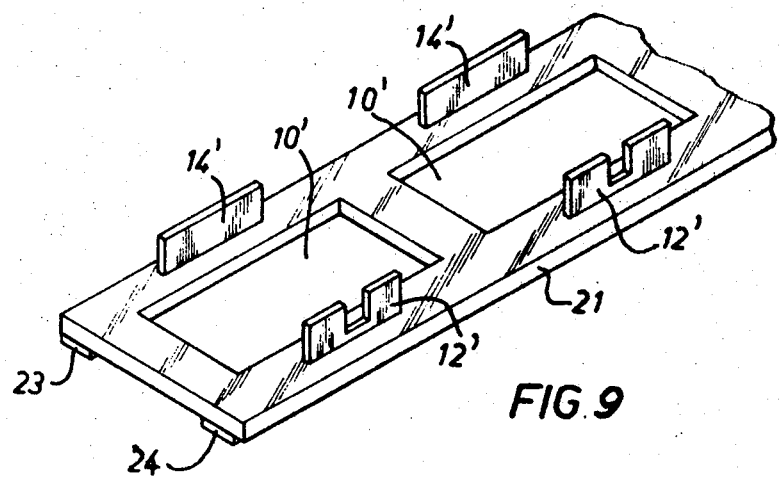
Figure 10:
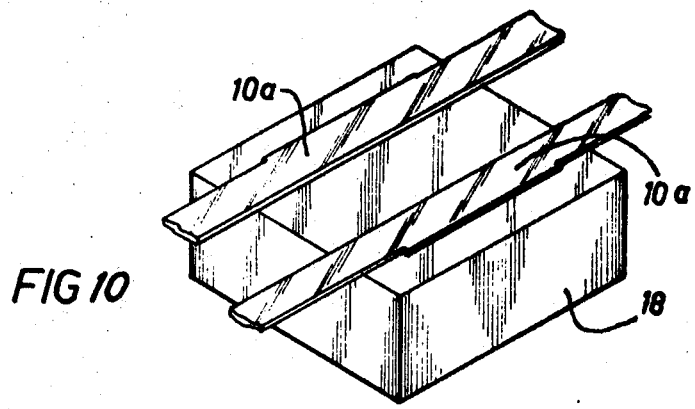
Figure 11:
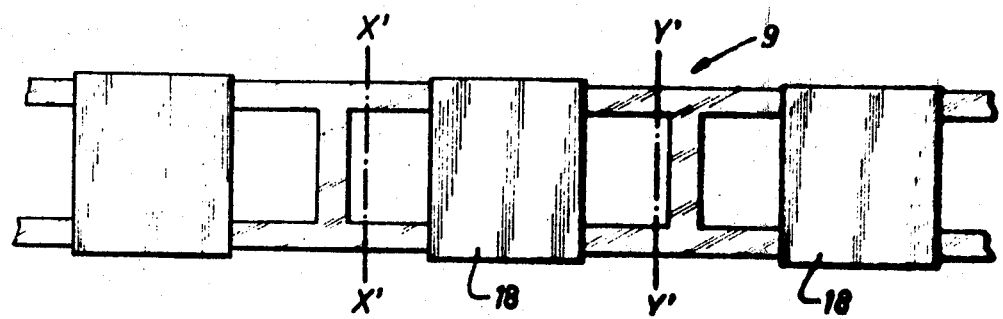
Figure 12:
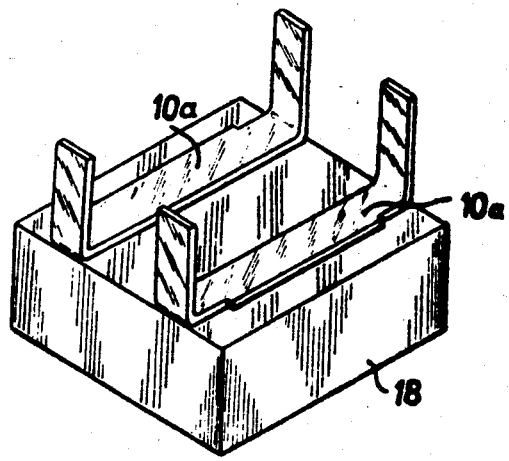

Various embodiments of the condenser according to the invention will now be described as non-limiting examples and by reference to the accompanying drawings, wherein:

FIG. 1 is a perspective view of a first embodiment of the condenser;
FIG. 2 shows the condenser of FIG. 1 and a printed circuit on which it is to be fixed;
FIG. 3 is a view similar to FIG. 2, the condenser being fixed to the printed circuit;
FIG. 4 is an exploded perspective view of an assembly for fixing lead connection plates to condensers;
FIG. 5 is a plan view of the assembly of FIG. 4;
FIG. 6 is a section on the line VI—VI of FIG. 5;
FIG. 7 is an elevation of the completed condenser, with its output plates;
FIG. 8 is a perspective view of an element for use in attaching lead connector plates to a condenser;
FIG. 9 is a perspective view of another such element;
FIG. 10 is a perspective view of another embodiment of the condenser;
FIG. 11 is a plan view similar to FIG. 5, showing alternative lead connector plate lengths; and
FIG. 12 is a perspective view of a condenser with the output plates folded.

Referring to FIG. 1, there is indicated at 1 a condenser which is in the form of a rectangular parallelepiped, its lower face 1a being a flat surface.

The lead connection zones of the condenser 1 are provided by two thin flat plates 2, which are formed by metallization on two separate insulating supports 3 fixed to the face 1a of the condenser. The plates 2 are, for example, tinned nickel. One of the lateral faces of each of the supports is also metallized, as indicated at 4, so as to ensure the connection of the plates 2 to the condenser.

FIG. 2 shows a printed circuit comprising a support 5 and two arms 6 to which the condenser 1 is to be connected. The spacing of these arms is equal to that of the plates 2.

For fixing the condenser 1 on the printed circuit, it is sufficient to place it in position and solder the plates 2 to the arms 6 as shown in FIG. 3.

One method of manufacturing this condenser is indicated in FIGS. 4 to 7.

In FIG. 4, there are shown at 7 tantalum condensers, each of whose bodies forms the cathode, while the anode is formed by a wire 8 extending from the body 7, being insulated therefrom.

For fixing the output electrodes on the condenser, a metallic strip is used in the method shown in FIGS. 4 to 7, such a strip being generally indicated by the reference 9. This strip has a series of openings 10, the dimensions of which are larger than those of the condenser 7, defined by transverse bars 11 and longitudinal edge portions 10a of the strip. Along one edge of the strip 9 are a number of bent-over tabs 12, one opposite the middle of each of the openings 10, each tab 12 being formed with a recess 13 in the middle of its upper edge. Along the other edge of the strip 9 and facing each of the tabs 12, are further tabs 14 having substantially the same dimensions as the tabs 12 but with a tongue 15 cut from the middle and bent downwardly and inwardly about a line just above the edge of the strip to project towards said one edge.

The condensers 7 are arranged on the strip 9 with their anodes 8 engaging in the recesses 13 while their other ends rest on the downwardly bent tongues 15.

The cathodes 7 and the anodes 8 are then soldered to the strip 9, as indicated at 16 and 17, respectively, and the portion of each of the anodes 8 which projects beyond the strip 9 is cut off (FIG. 6).

Each of the condensers is then covered by means of a cap 18. As can be seen from FIG. 5, the width of said cap is substantially equal to the width of the tabs 12 and 14 and its length is substantially equal to the distance separating opposite tabs.

The assembly thus formed is then inverted, and a plastic material 19 is poured into the inverted caps, through the openings 10 in the strip 9, so that it is flush with the internal face of this strip. When the material 19 has set, the strip 9 is severed at the edges of the caps 18, as shown by the lines X—X and Y—Y in FIG. 5. The longitudinal edge portions 10a of the strip 9 that remain are thus kept electrically insulated from one another and project beneath the cap 18 (FIG. 7). They form the output plates of the condenser.

As a modification, the connections can be made separately for each condenser by replacing the strip 9 by a series of independent support elements equivalent to a section of the strip 9, such as the element indicated at 20 in FIG. 8. This element is in this case rectangular, but it could be of a different shape, for example, circular or oval.

As shown in FIG. 9, it is also possible to replace the metal strip 9 by a strip 21 of plastics material having openings 10'. Beneath the longitudinal edge portions are disposed two narrow metal strips 23 and 24 which may be partially embedded in the plastics material. These strips have tabs 14' and 12' which are similar to the tabs 14 and 12 and which project upwardly through slots in the strip 21.

The condenser shown in FIG. 10 is similar to that of FIG. 7, except that the output plates or foils 10a project in their direction of parallelism in relation to two opposite lateral faces of the cap 18, which forms the casing of the condenser.

In order to make this condenser, the procedure is as previously described, but instead of cutting the strip 9 opposite the caps 18, the said strip is cut at a certain distance from the lateral walls of the cap, as shown at X'—X' and Y'—Y' in FIG. 11. Furthermore, in order that the projecting part of the output plates or foils 10a may be of sufficient length, the openings 10 are given a length slightly longer than in FIG. 4.

It would also be possible to cut the strip 9 each side of every other cap and in addition to cut out the transverse bars 11. There would thus be simultaneously obtained condensers of the type shown in FIG. 7 and condensers according to FIG. 10.

The condenser shown in FIG. 12 is similar to that represented in FIG. 10, but the free ends of the plates 10a are bent over at right angles away from the cap 18, thus providing a component which can be plugged in or which can be soldered onto a printed circuit. These bent-over ends can be shaped so as to facilitate the subsequent connections.

I claim:

1. A process for the manufacture of an electrical device comprising providing a sheet having opposite surfaces, forming in said sheet an aperture and a pair of spaced tabs separated by said aperture, forming in one of said tabs a notch, placing an electrical component having a body and a lead between said tabs with said lead in said notch, electrically connecting said component to at least one of said tabs, covering said component and said tabs on one surface of said sheet with an insulative housing having opposite sides overlying said aperture, supplying an insulative material into said insulative housing through said aperture from the other surface of said sheet to engage said component, and severing said sheet across said aperture, on opposite sides of said insulative housing.

2. A process according to claim 1, wherein said body constitutes a first electrode and said lead is insulated from said body and constitutes a second electrode, and including forming a tongue in the other of said tabs to project transversely of said tabs, which tongue serves as a support for said body.

3. A process according to claim 1 including forming a plurality of said devices simultaneously using a single said sheet, the latter being a metal strip provided with a series of apertures defined by transverse bars and longitudinal edge portions of the strip, the latter carrying said pair of spaced tabs opposite the middle of each aperture, each pair of spaced tabs being covered by an insulative housing and wherein, after the insulative material has been supplied and has set, severing the strip into sections between each insulative housing to remove the transverse bars which lie between adjacent insulative housings, to isolate the two longitudinal edge portions from one another.

4. A process according to claim 3, in which the strip is cut into sections proximate each said opposite sides of the insulative housings.

5. A process according to claim 3, in which the strip is cut into sections remote from each said opposite sides of the insulative housings.

6. A process according to claim 1, wherein said sheet is a strip of plastic material having two metal portions constituting said tabs.

References Cited

UNITED STATES PATENTS

| | | | |
|---|---|---|---|
| 2,613,252 | 10/1952 | Heibel | 29—627 |
| 3,270,399 | 9/1966 | Ohntrup | 29—588X |
| 2,964,831 | 12/1960 | Peterson | 29—588 |
| 2,830,698 | 4/1958 | Coda et al. | 29—25.42 |
| 3,411,193 | 11/1968 | Takasa | 29—628X |
| 3,423,638 | 1/1969 | Dix et al. | 29—588X |
| 3,444,614 | 5/1969 | Scholer | 29—588 |

JOHN F. CAMPBELL, Primary Examiner

R. W. CHURCH, Assistant Examiner

U.S. Cl. X.R.

29—25.42, 25.35, 588, 589, 590, 619, 621, 577, 627; 113—119; 174—68.5, 52; 264—272; 317—101, 242